Patented June 9, 1953

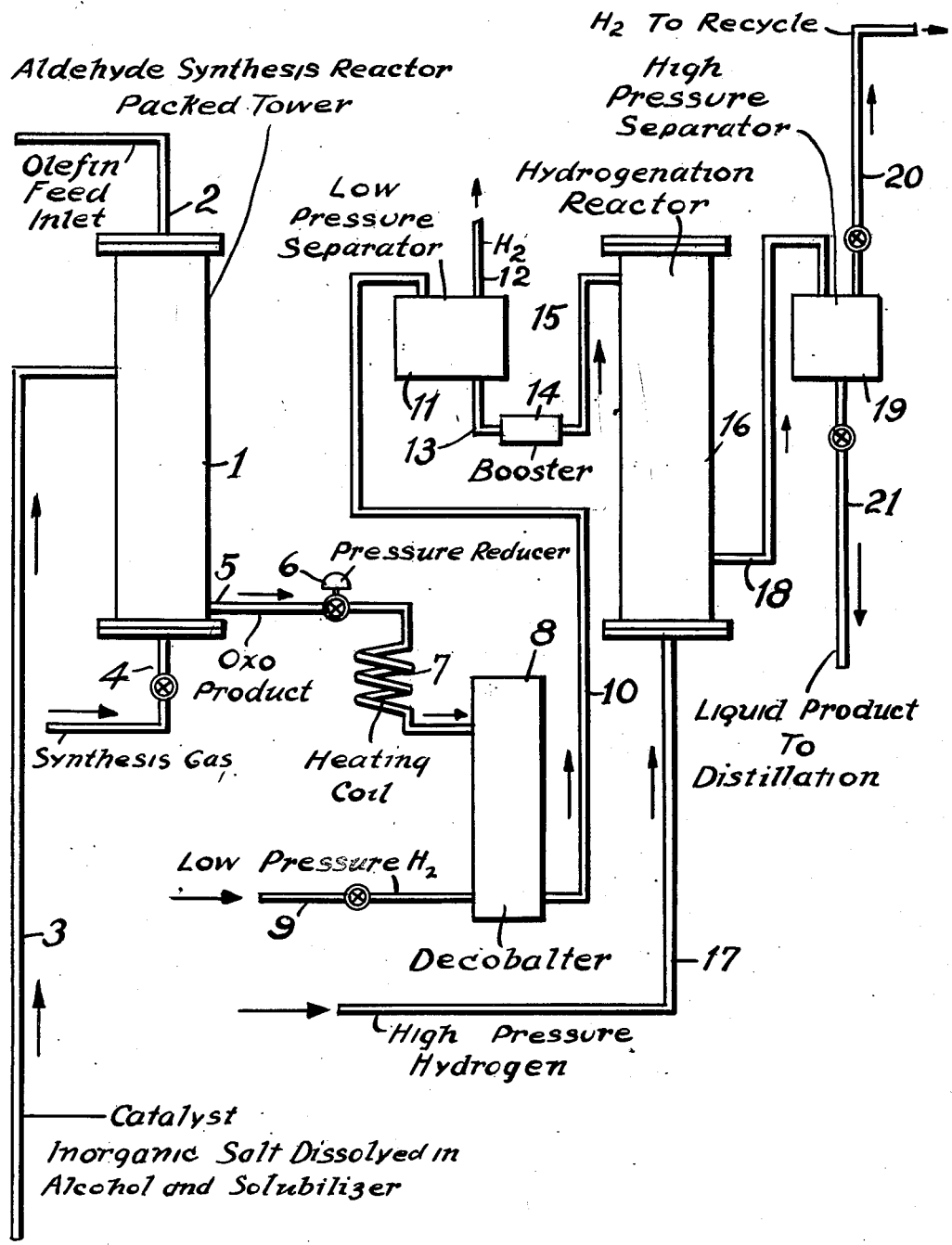

2,641,613

UNITED STATES PATENT OFFICE 2,641,613

CATALYTIC SYNTHESIS OF ALCOHOLS

Joseph K. Mertzweiller, Baton Rouge, and Paul T. Parker, East Baton Rouge, La., assignors to Standard Oil Development Company, a corporation of Delaware Application July 1, 1948, Serial No. 36,516

4 Claims. (Cl. 260—604)

This invention relates to improvements in the art of synthesizing oxygenated hydrocarbons in a process involving a chemical reaction between a monoolefin, hydrogen and carbon monoxide in a first stage, followed, if desired, by reduction or oxidation in a second stage. In particular, the invention relates to catalysts for the foregoing reaction and means for procuring said catalysts in solution or well dispersed in the liquefied reaction mixture.

Prior to this invention, others have synthesized oxygenated hydrocarbons such as alcohols by reacting together carbon monoxide, hydrogen and a monoolefinic hydrocarbon to form an intermediate product which was subsequently reduced. The reaction was carried out in the presence of a cobalt-containing catalyst or an equivalent catalyst, in the first of a two-stage operation, the product formed in the first stage being predominantly aldehyde with a minor portion of alcohols, and in a second stage, hydrogenation of the product of the first stage to form the corresponding alcohol, was effected.

These reactions may be simply represented for a monoolefin feed as follows, although it is understood that other reactions may take place to a minor extent. (R represents a hydrocarbon radical.)

(1)
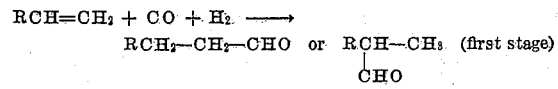

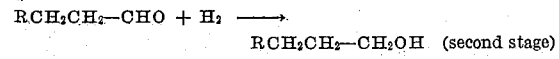

(2)

(2a)

It is evident from the above reactions that a primary alcohol containing one more carbon atom than the starting monoolefin will result and that the position in the molecule of the added hydroxyl group will depend on the position of the double bond in the original olefin, or the position to which the double bond may shift by isomerization under the reaction conditions used. The purpose for which the product alcohol is to be used determines the type of olefin to be selected as a feed stock.

Alcohols prepared by the foregoing process may be used for many purposes, such as for solvents, antifoam agents, and after esterification or sulfation, as plasticizers, detergents and wetting agents. For example, for the preparation of sodium lauryl sulfate for use as a detergent, the preferred olefin feed for the alcohol synthesis is undecene-1. Other olefins and diolefins such as ethylene, propylene, butylenes, pentenes, hexenes, butadiene, pentadienes, olefin polymers, such as diisobutylene, triisobutylene, polypropylene, and olefinic fractions from the hydrocarbon synthesis process, thermal or catalytic cracking operations, and other sources may be used as starting materials depending on the nature of the aldehydes and alcohols that it is desired to produce.

The carbon monoxide and hydrogen may be manufactured by conventional methods from many materials, such as coke, coal, lignite, or hydrocarbon gases, such as natural gas or methane.

The solid fuels may be converted by known methods into carbon monoxide and hydrogen by treatment with steam and/or carbon dioxide. The ratio of carbon monoxide to hydrogen may be varied by varying the amount of steam used to react with the solid fuel so that a part of the carbon monoxide may react with the steam to form carbon dioxide and hydrogen thus increasing the molar ratio of hydrogen to carbon monoxide. The carbon dioxide may be removed by scrubbing the gaseous mixture with say aqueous ethanolamine or other basic substances.

The hydrocarbon gases may be converted to synthesis gas ($H_2+CO$) in a number of ways, such as by treatment with oxygen, carbon dioxide, or steam, or a combination of steam and carbon dioxide, catalytically, in accordance with known procedure.

In the aforementioned, first, or aldehyde synthesis step, the ratio of hydrogen to carbon monoxide employed may vary appreciably. Ratios of 0.5 volume of hydrogen to 2.0 volumes of hydrogen per volume of carbon monoxide may be employed. The preferred ratios comprise about 1.0 volume of hydrogen per volume of carbon monoxide. The quantities of olefins employed per volume of synthesis gas ($CO+H_2$) likewise vary considerably, as well as the composition of the olefin feed stream. The olefin feed may comprise pure olefins or may comprise olefins containing paraffinic and other hydrocarbons. In general, it is preferred that the olefin feedstock comprise olefins having from 2 to 18 carbon atoms in the molecule. Particularly desirable olefins comprise hydrocarbons having from about 8 to 18 carbon atoms in the molecule. The aldehyde synthesis reaction is generally conducted employing a pressure in the range from about 100 to 300 atmospheres and a temperature in the range of about 200° F. to 400° F. The quantity of hydrogen plus carbon monoxide with respect to olefin utilized may vary considerably, as for example from 1000 to 45,000 standard conditions cubic feet of carbon monoxide and hydrogen per barrel of liquid olefin feed. In general, approximately 2500 to 15,000 cubic feet of synthesis gas per barrel of olefin feed is employed.

In the hydrogenation step where the product desired is an alcohol, any catalyst, as for example, nickel, copper, tungsten sulfide plus nickel sulfide, or sulfides of groups VI and VIII metals of the periodic table, alone or, mixtures thereof may be utilized. The hydrogenation temperatures are generally in the range from about 150° F. to 750° F., depending on the catalyst employed, while the pressures are usually in the range of about 100 to 300 atmospheres.

Previously, the catalyst employed in the first stage was a soap or other organo compound of cobalt and it was usually dissolved in the liquefied olefin feed.

It has now been found that inorganic salts of metals, and specifically salts of cobalt can be used as catalysts in the first or "oxo" stage.

In the accompanying drawing there is shown diagrammatically the essential elements of an apparatus in which a preferred modification of the invention may be carried into effect.

Referring in detail to the drawing 1 represents a packed reactor into which a liquefied olefin is discharged from feed line 2.

The catalyst comprising say cobalt chloride hexahydrate dissolved in a higher alcohol and a solubilizer such as ethyl Cellosolve is discharged into the reactor through line 3. The amount of catalyst so dissolved should be from 0.5 to 4 weight percent of the total feed. Synthesis gas, that is, a gaseous mixture containing hydrogen and carbon monoxide in equal molar proportions is discharged to the bottom of reactor 1 through line 4. The oxo products are withdrawn from the reactor 1 through line 5 carrying a pressure reducing valve 6 then are forced through heating coil 7 thence passed into a zone into which hydrogen at low pressure is also discharged from line 9. The treatment with hydrogen in zone 8 is for the purpose of converting the cobalt into an insoluble form so that it may be separated with the crude product. Since, the cobalt is probably converted to cobalt carbonyl in 1 and further since this compound is soluble in the aldehyde product, it is of course necessary to remove it so that it will not separate out and cause plugging of transfer lines, etc. The crude product from the first stage substantially free of cobalt is then discharged into a low pressure separator from line 10 in which a stream of hydrogen-containing gas is withdrawn overhead through line 12. Crude product is withdrawn through line 13 thence forced through a pump 14 then passed via line 15 into the second stage 16. In 16 where the aldehyde product is treated with hydrogen under high pressure, the said hydrogen being introduced through line 17 represents the second stage of the process wherein the aldehyde compounds are converted into the corresponding alcohols. In this hydrogenation step from 5,000-20,000, preferably 10,000-15,000 standard cubic feet of hydrogen per barrel of aldehyde material are utilized. The hydrogenated product is withdrawn from 16 through line 18 discharged into a high pressure separator 19 from which hydrogen is drawn to line 20 and recycled either in the decobalting step performed in 8 or the hydrogenation performed in 16. The crude alcohol product is withdrawn from a high pressure separator 19 through line 21 and is then delivered to a distillation product recovery system where the desired alcohols may be recovered in pure form.

As previously stated, the present improvements go to the manner of providing new catalyst for "oxo" synthesis. Previously, catalyst used was a cobalt soap or other organo cobalt compound.

It is now shown that inorganic salts may be employed as catalysts for the synthesis of alcohols from olefins, carbon monoxide and hydrogen. In such cases the salts are dissolved in alcohol or first stage products and dispersed by mixing with the olefin feed. The salts are of limited solubility in the alcohol or first stage product and to obtain increased concentrations, larger amounts of solvents must be employed which results effectively in dilution of the feed. Use of small quantities of methyl or ethyl Cellosolve (methyl or ethyl ethylene glycol monoether) greatly increases the solubility of the inorganic salts in the alcohols of first stage process. Other high powered solvents such as the esters (e. g. butyl acetate) may be employed as adjuvant solvents or solvent aids.

For example, in preparing the dissolved cobalt chloride $CoCl_2.6H_2O$ catalyst for the use in a certain test which was made, it was found that 1.5 grams of $CoCl_2.6H_2O$ could not be dissolved in as much as 19 grams of $C_9$ alcohol, but an addition of 1 to 2 grams of ethyl Cellosolve, readily dissolved all of the cobalt chloride hexahydrate. Use of large quantities (above 20 weight percent) of this additive alone as a solvent is impractical as it is relatively insoluble in the olefin feeds and results in very poor dispersion or no dispersion at all.

In order to illustrate the invention further, we set forth below the form of a specific example, the conditions of and the results obtained during a synthesis operation.

*Example*

1.5 grams of cobalt chloride hexahydrate was dissolved in a mixture of 19 grams of $C_9$ alcohols and 2 cc. of ethyl Cellosolve. This solution was added to 362.5 grams of diisobutylene. The mixture was treated for 5 hours at 275° F. with a synthesis gas containing 1.2 mols of hydrogen per mol of carbon monoxide while maintaining the reaction mixture under a pressure of 3000 p. s. i. g. The product showed the following inspection values after hydrogenation employing a nickel catalyst carried on a suitable carrier.

| | |
|---|---|
| Hydroxyl number | 243 |
| Carbonyl number | 11 |
| Saponification number | 31 |
| Acid number | 0.7 |

The original olefins present, were converted to oxygenated organic compounds to the extent of 83% of said olefins, and 71% of the thus converted olefins appeared as $C_9$ alcohols.

To recapitulate briefly, it has been discovered that inorganic salts of cobalt, such as the chloride, sulfate, nitrate, etc. may be used to catalyze the reaction between carbon monoxide, hydrogen and olefins to give good yields of aldehydes and other oxygenated compounds. Use of such compounds have distinct advantages over the prior use of such organo cobalt catalysts such as the cobalt soaps, for the following reasons:

A catalyst preparation step is eliminated. Normally the metal soaps are prepared by saponification of the acids and treatment with an aqueous solution of the corresponding inorganic salt. The soap is dissolved in the hydrocarbon feed, and may require a solubilizer to prevent gel formation. The inorganic salt and solubilizer are dissolved in a small quantity of alcohol or aldehyde product and added to the olefin feed. Hence substantial savings in cost of catalyst preparation are effected.

The re-use of cobalt recovered from decobalting operations is facilitated since the metal may be recovered as an inorganic salt.

Numerous modifications of the invention may be made by those familiar with the art without departing from the spirit thereof.

What we claim is:

1. In a continuous carbonylation process wherein olefinic carbon compounds, carbon monoxide and hydrogen are contacted at elevated temperatures and at a pressure in the range of from 2,000 to 4,000 p. s. i. g., with a carbonylation catalyst under conditions to produce aldehydes containing one more carbon atom than said olefinic carbon compounds, the improvement which comprises subjecting the reactants to synthesizing conditions of temperature and pressure in the presence of a catalyst comprising an inorganic salt of cobalt dissolved in an organic solvent which is a first stage carbonylation product selected from the group consisting of aldehydes and alcohols, said salt being solubilized by an alkyl ether of ethylene glycol.

2. The process of claim 1 in which the inorganic salt is dissolved in a higher alcohol and mixed with the liquified olefinic compound prior to the reaction.

3. The process of claim 1 in which the aldehyde product is subjected to reduction in the presence of hydrogen to form a corresponding alcohol.

4. The process of claim 1 wherein said ether is the mono ethyl ether of ethylene glycol.

JOSEPH K. MERTZWEILLER.
PAUL T. PARKER.

References Cited in the file of this patent
UNITED STATES PATENTS

| Number | Name | Date |
| --- | --- | --- |
| 2,402,133 | Gresham et al. | June 18, 1946 |
| 2,437,600 | Gresham et al. | Mar. 9, 1948 |
| 2,449,470 | Gresham et al. | Sept. 14, 1948 |

FOREIGN PATENTS

| Number | Country | Date |
| --- | --- | --- |
| 564,148 | France | Mar. 21, 1923 |

OTHER REFERENCES

Technical Oil Mission, Reel 36, Item 21, Bag. No. 3452, CIOS Target No. 30/5.01, Ruhrchemie A. G. Sterkrade-Holten, German application O. Z. 13,366 to I. G. F. Deposited in Library of Congress April 18, 1946. (German application I 71,966 IVd/Ko; Copy in Lib. of Congress.)

"Interrogation of Dr. Otto Roelen," BIOS Final Report 447, pp. 44 and 45. Published July 18, 1947, by Office of Technical Services, P. B. 77,705.